INVENTORS
PAUL F. HAYNER
GERALD LEON BERNIER

ATTORNEY

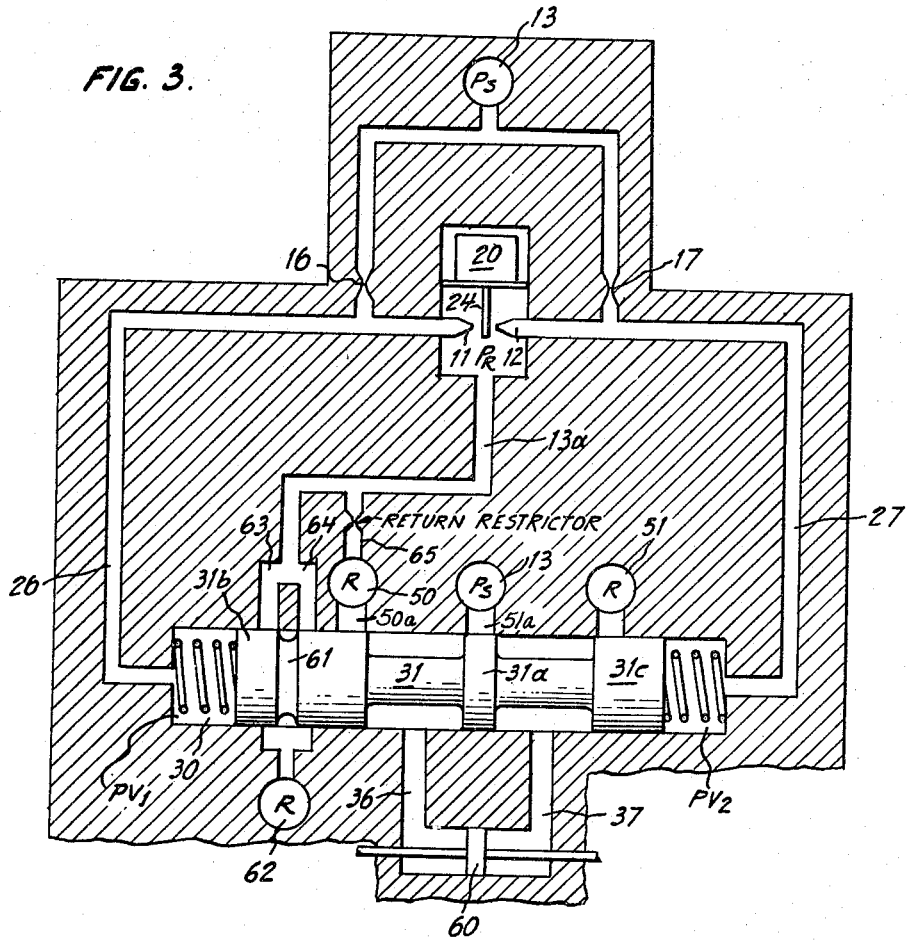

United States Patent Office 3,326,088
Patented June 20, 1967

3,326,088
HYDRAULIC SERVO CONTROL SYSTEMS
Paul F. Hayner, Lexington, Mass., and Gerald Leon Bernier, Nashua, N.H., assignors to Sanders Associates, Inc., Nashua, N.H., a corporation of Delaware
Original application Sept. 5, 1963, Ser. No. 306,854, now Patent No. 3,282,168. Divided and this application Feb. 7, 1966, Ser. No. 525,566
4 Claims. (Cl. 91—461)

This application is a division of co-pending patent application Ser. No. 306,854 for "Hydraulic Servo Control Systems," filed Sept. 5, 1963, now Patent No. 3,282,-168.

This invention relates to a hydraulic servo control system, and more particularly, to such systems employing laminar flow proportional position servo valves characterized by low noise, high reliability, low leakage, and constant gain with temperature and load changes. While our system has particular utility in submarine steering, diving, and hovering controls, wherein low noise and high reliability are important, it will be understood that it may be used in other environments wherein the above qualities are important.

Among the objects of our invention are:

To provide such a system having very low acoustical, mechanical, and fluid flow noises;

To provide such a system in which the output flow varies directly with the input signal, and is substantially independent of temperature and load;

To provide such a system embodying laminar flow restrictors, and having a flow measuring instrument;

To provide a multi-stage system having all the advantages of flapper and jet pipe systems, plus low leakage;

To provide such a system providing load and temperature compensation to provide constant flow gain;

To provide such a system incorporating control line pressure sensing for load compensation, and laminar restrictors for temperature compensation.

Still other objects and advantages of our invention will be apparent from the specification.

The features of novelty which we believe to be characteristic of our invention are set forth with particularity in the appended claims. Our invention itself, however, both as to its fundamental principles and as to its particular embodiments, will best be understood by reference to the specification and accompanying drawing, in which FIG. 1 is a diagrammatic view, partly in section, of a system according to our invention;

FIG. 3 is a diagrammatic view of our system embodying the low leakage flapper or jet servo valve in a two-stage servo system.

Figure 1:
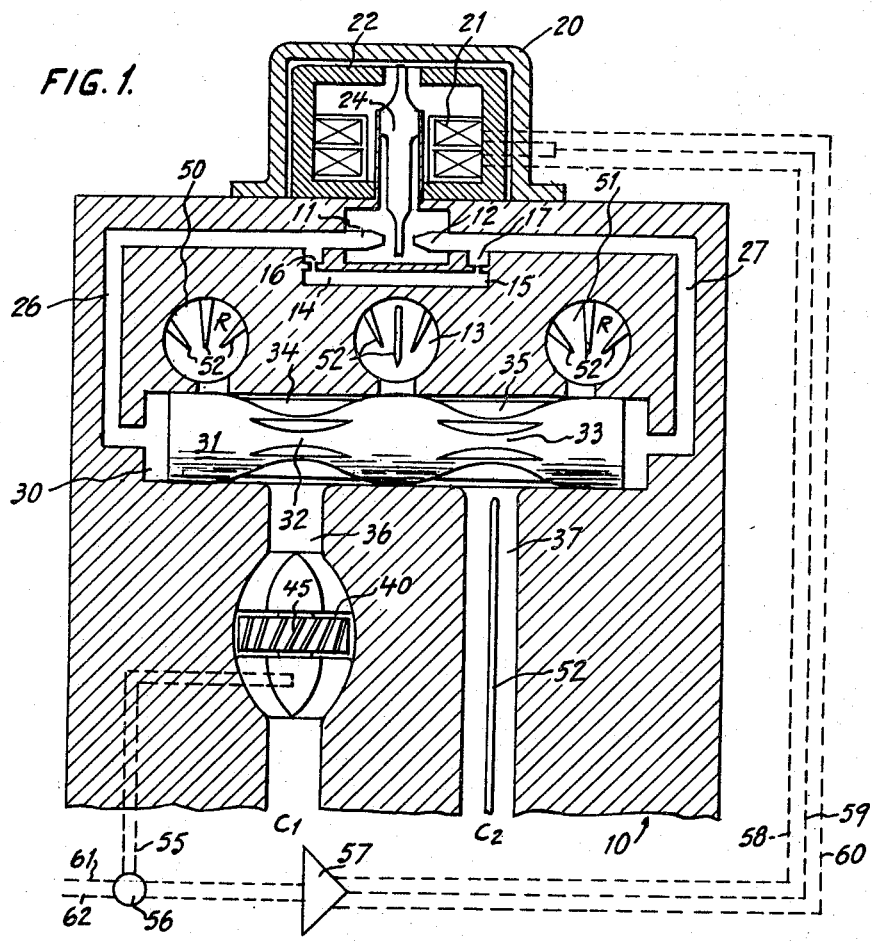

Referring now to FIG. 1, 10 designates the valve casing, or housing, having the control jets 11 and 12, to which liquid under pressure is supplied from pilot supply line 13 through lines 14 and 15 and restrictors 16 and 17 adjacent jets 11 and 12. These constitute a hydraulic amplifier.

Mounted on top of casing 10 is the electromagnetic control housing 20 containing the coils 21 and pole pieces 22 which control the position of flapper 24, which moves from left to right or vice versa to abut jet 11 or 12. Conduits 26 and 27 lead from upstream of jets 11 and 12 to opposite ends of piston chamber 30 containing laminar flow piston servo valve 31, which is arranged for axial motion to determine the flow of fluid.

The piston has two reduced portions 32 and 33 intermediate its ends provided with radial extending laminar flow vanes 34 and 35 in the reduced portions, and the reduction of area is in the form of a continuous smooth curve as shown in FIG. 1.

Control conduits 36 and 37 open into valve chamber 30 and lead to the load (not shown in FIG. 1), which may be a hydraulic piston operating in either direction, such as shown in U.S. Patent 2,939,430.

Figure 2:
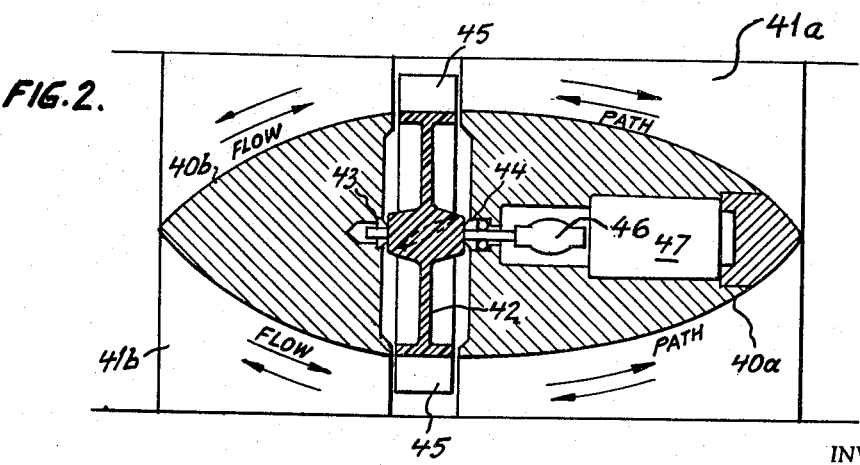
FIG. 2 is a detail view, partly in section, of the flow indicator shown in FIG. 1.

Conduit 36 contains a flow indicator 40, shown on an enlarged scale in FIG. 2. The flow indicator is formed by a pair of semi-elliptical end pieces 40a and 40b provided with radially and longitudinally extending vanes 41a and 41b to provide laminar flow. Positioned between the end pieces is a rotor 42, journalled in low friction bearings 43 and 44 (FIG. 2), carrying on its periphery a series of skew blades 45. The rotor is preferably formed of light weight plastic, floats in the hydraulic fluid, is impervious to shock, and has a low inertia for fast response.

Connected to rotor 42 through coupling 46 we provide a tachometer 47 having a low inertia rotor, to measure fluid flow in conduit 36, and with suitable means such as leads 55 for indicating and/or transmitting the tachometer reading, to determine the actual fluid flow. Return lines 50 and 51 leading from the load (FIG. 1) are provided with laminar flow vanes 52, as are pilot supply line 13 and control conduit 37.

The output of the tachometer is fed to a suitable summing network 56, which feeds amplifier 57, which, through leads 58, 59, and 60, controls the position of flapper 24. The summing network may be supplied with input signals, through leads 61 and 62, these signals being proportional to the system error signal.

In neutral or null position, as shown in FIG. 1, the piston servo valve 31 is midway of its travel, and pilot supply line 13 and return lines 50 and 51 are closed. As the piston supply moves to the left, pilot line 13 is opened to control line 37, return line 51 is closed, and return line 50 is opened, the area of the opening being proportional to movement of the piston from center position. As the piston moves to the right from central position, pilot supply line 13 is opened into control conduit 36, return line 50 is closed, and return line 51 is opened. In either case, fluid flow passes through control conduit 36 in one direction or the other, and actuates the tachometer to provide a measurement of flow, regardless of direction and amount.

Referring now to FIG. 3, we have shown a modified form of our invention, particularly effective in reducing leakage in the system when the valve has zero input signal. In all types of hydraulic amplifiers heretofore known, leakage is excessive after even a small amount of use.

In FIG. 3, for simplicity, we have shown the various conduits and valves, together with the load. In this instance, as before, 11 and 12 are the jets, 24 the flapper, and 20 the housing containing the coils and pole pieces for actuating the flapper. As before, conduits 26 and 27 lead from upstream of the jets to opposite ends of valve chamber 30. In this instance, again, piston servo valve 31 is shown in the center or null position, in which pilot supply line 13 is closed by central piston land 31a, and ports 50a and 51a, and thus return lines 50 and 51 are closed by end piston lands 31b and 31c respectively, and no fluid is admitted to conduits 36 or 37 to move the load piston 60 in its cylinder. Land 31b is provided with a circumferential groove 61. In this instance, the pilot return line 13a is bifurcated at the valve end into ports 63 and 64 which are closed by piston servo valve 31 in center or null position. In this instance, return line 50 connects to pilot return line 13a through return restrictor 65.

In operation, for any signal, piston servo valve 31 moves away from neutral or null position, thus opening the pilot return line 13a through port 63 or 64, and connecting it to system return line 62, or whatever serves as pilot return during normal operation. Leakage through the return restrictor 65 is insignificant. For a zero input signal, the piston servo valve 31 centers itself and shuts off the system return, and any pilot stage leakage must flow through the return restrictor 65, which limits the leakage to an acceptable amount. Thus, it will be seen that, whereas all flapper and jet pipe valves heretofore known have had high leakage at neutral or zero signal position, and piston type pilot valves have dead space to obtain low leakage and are subject to wear, the embodiment of our invention just described gives all the advantages of flapper and jet pipe valves plus low leakage. It should be noted that restriction can be afforded by a series of orifices, for instance, in order that low leakage be maintained without requiring small orifices subject to change due to wear or erosion.

In the foregoing we have shown certain preferred embodiments of our invention, and the best mode presently known to us for practicing the same, but it should be understood that modifications and changes may be made without departing from the spirit and scope of our invention.

What is claimed is:

1. In a hydraulic servo system, in combination, a pilot return, a flapper and jet pipe valve controlling a piston servo valve in turn controlling the flow of liquid to a piston load, said piston servo valve controlling the pilot return and having means for shutting off the pilot return in null position, and means for providing limited flow in the pilot return in said null position.

2. In a hydraulic servo system, in combination, a pilot return line, a system return line, a flapper and jet pipe valve controlling a piston servo valve, said piston servo valve being positioned within a valve housing and controlling a piston load, said pilot return line having first and second branches, said first branch being connected to said system return line through a return restrictor, means connecting said second branch to said system return line, and said second branch by-passing said first branch and thus said return restrictor, said connecting means including means on said piston servo valve for controlling the flow of fluid through said second branch in response to movement of said piston servo valve.

3. A hydraulic servo system in accordance with claim 2, wherein said means on said piston servo valve for controlling flow of fluid through said second branch is a land having a groove therein, said groove opening said second branch to permit the flow of fluid therethrough upon movement of said piston servo valve in either direction.

4. A hydraulic servo system in accordance with claim 2, including port means connecting said first branch of said pilot return line to said piston servo valve, said piston servo valve including a land closing said first and second branches of said pilot return line in null position, said first and second branches being positioned with respect to said land so that movement of said piston servo valve from its null position in one direction only opens said first branch and movement of said piston servo valve in either direction from its null position opens said second branch.

References Cited

UNITED STATES PATENTS

| | | | |
|---|---|---|---|
| 2,879,467 | 3/1959 | Stein | 91—461 |
| 2,904,055 | 9/1959 | Witherell | 137—625.62 |
| 2,931,343 | 4/1960 | Moog | 137—625.62 |
| 2,947,286 | 8/1960 | Baltus et al. | 91—365 |
| 3,071,160 | 1/1963 | Weichbrod | 138—40 |
| 3,101,650 | 8/1963 | Blanten | 137—625.62 |

MARTIN P. SCHWADRON, *Primary Examiner.*

PAUL E. MASLOUSKY, *Examiner.*